US012776588B2

(12) United States Patent
Jang et al.

(10) Patent No.: US 12,776,588 B2
(45) Date of Patent: Oct. 27, 2026

(54) SPLIT SECTOR INCLINED ANTENNA REFLECTOR FOR IMPROVED GAIN

(71) Applicant: JOHN MEZZALINGUA ASSOCIATES, LLC., Liverpool, NY (US)

(72) Inventors: Taehee Jang, Allen, TX (US); Gilberto Guerra Arias, Plano, TX (US); Naveena Appari, Farmer's Branch, TX (US)

(73) Assignee: JOHN MEZZALINGUA ASSOCIATES, LLC., Liverpool, NY (US)

(*) Notice: Subject to any disclaimer, the term of this patent is extended or adjusted under 35 U.S.C. 154(b) by 36 days.

(21) Appl. No.: 18/809,748

(22) Filed: Aug. 20, 2024

(65) Prior Publication Data

US 2025/0070479 A1 Feb. 27, 2025

Related U.S. Application Data

(60) Provisional application No. 63/520,998, filed on Aug. 22, 2023.

(51) Int. Cl.

| | |
|---|---|
| ***H01Q 1/24*** | (2006.01) |
| ***H01Q 3/34*** | (2006.01) |
| ***H01Q 21/06*** | (2006.01) |
| ***H01Q 21/08*** | (2006.01) |
| ***H01Q 21/20*** | (2006.01) |

(52) U.S. Cl.

CPC ............. *H01Q 21/062* (2013.01); *H01Q 3/34* (2013.01); *H01Q 21/08* (2013.01); *H01Q 21/20* (2013.01)

(58) Field of Classification Search

CPC ........................................................ H01Q 1/246

See application file for complete search history.

(56) References Cited

U.S. PATENT DOCUMENTS

| | | | | |
|---|---|---|---|---|
| 2020/0411961 | A1* | 12/2020 | Kasani ................. | H01Q 19/108 |
| 2021/0029556 | A1* | 1/2021 | Wu ...................... | H01Q 19/106 |
| 2021/0305684 | A1 | 9/2021 | Hou et al. | |
| 2024/0387991 | A1* | 11/2024 | Di .......................... | H01P 1/184 |

FOREIGN PATENT DOCUMENTS

| | | |
|---|---|---|
| CN | 115810887 A | 3/2023 |

* cited by examiner

*Primary Examiner* — David E Lotter

(74) *Attorney, Agent, or Firm* — BRYAN CAVE LEIGHTON PAISNER LLP

(57) ABSTRACT

A multiband antenna comprises a split sector reflector having a first inclined sector panel having a first mechanical tilt angle in an azimuth plane, and a second inclined sector panel having a second mechanical tilt angle in the azimuth plane; a first plurality of columns of first dipoles disposed on the first inclined sector panel; and a second plurality of columns of first dipoles disposed on the second inclined sector panel, wherein the first plurality of columns of first dipoles are coupled to a first feed circuit that is configured to impart a first electrical tilt at a first electrical tilt angle in the azimuth plane, and wherein the second plurality of columns of first dipoles are coupled to a second feed circuit that is configured to impart a second electrical tilt at a second electrical tilt angle in the azimuth plane.

15 Claims, 9 Drawing Sheets

700

SPLIT SECTOR INCLINED ANTENNA REFLECTOR FOR IMPROVED GAIN

CROSS-REFERENCE TO RELATED APPLICATIONS

This application claims the benefit of U.S. Provisional Application No. 63/520,998, filed on Aug. 22, 2023, all of which are incorporated by reference in their entirety herein.

BACKGROUND OF THE INVENTION

Contemporary cellular communications, such as 5 G NR (New Radio) or LTE (Long Term Evolution) involve the simultaneous use of multiple frequency bands. Accordingly, cellular antennas, such as macro antennas that are deployed on cell towers, must be configured to operate in multiple frequency bands: low band (LB) (617-894 MHZ), mid band (MB) (1695-2690 MHz), C-Band and CBRS (Citizens Broadband Radio Service) (3.4-4.2 GHz). Challenges occur in designing such a multiband antenna because design constraints such as wind loading require that the multiband antenna have a minimal profile, and packing antenna dipoles of different frequencies in close proximity to each other causes inter-band interference such as cross polarization. Another challenge is that certain frequency bands involve stringent gain performance requirements.

Accordingly, what is needed is a multiband antenna design that improves gain performance in specific frequency bands without negatively impacting other frequency bands.

SUMMARY OF THE INVENTION

An aspect of the disclosure involves an antenna. The antenna comprises a split sector reflector having a first inclined sector panel having a first mechanical tilt angle in an azimuth plane, and a second inclined sector panel having a second mechanical tilt angle in the azimuth plane; a first plurality of columns of first dipoles disposed on the first inclined sector panel; and a second plurality of columns of first dipoles disposed on the second inclined sector panel, wherein the first plurality of columns of first dipoles are coupled to a first feed circuit that is configured to impart a first electrical tilt at a first electrical tilt angle in the azimuth plane, and wherein the second plurality of columns of first dipoles are coupled to a second feed circuit that is configured to impart a second electrical tilt at a second electrical tilt angle in the azimuth plane.

DETAILED DESCRIPTION OF THE INVENTION

Figure 1A:
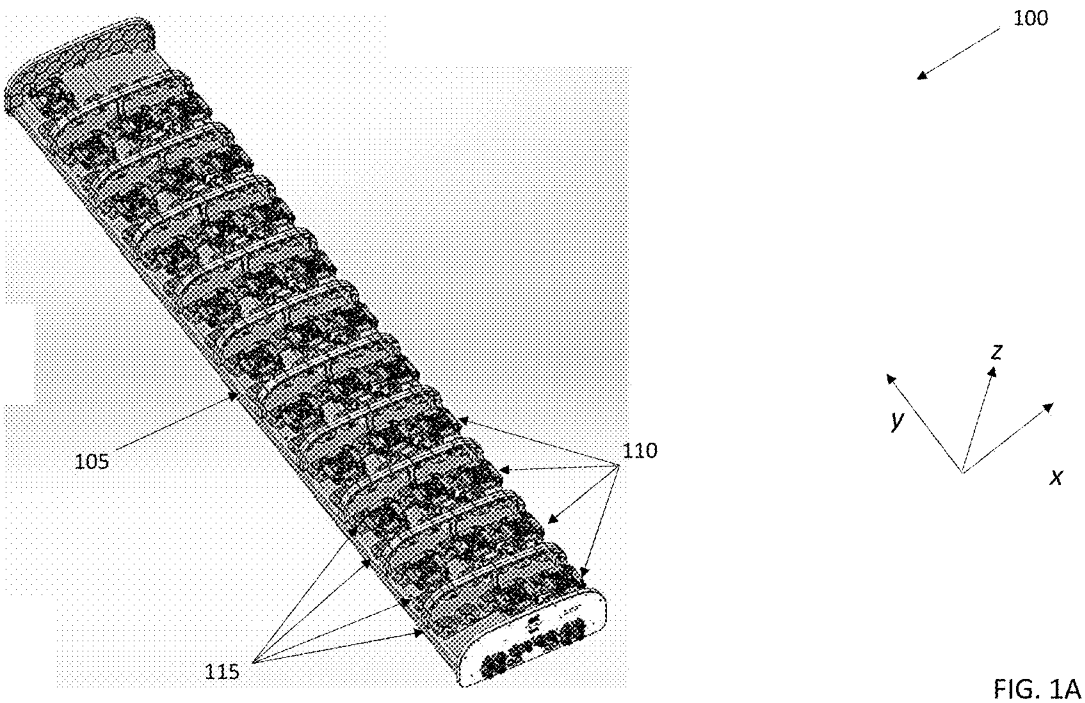
FIG. 1A illustrates an exemplary antenna having a split sector array face according to the disclosure.

FIG. 1A illustrates an exemplary antenna 100 having a split sector array face according to the disclosure. Antenna has a split sector reflector 105 on which are disposed a plurality of low band dipoles 110 and a plurality of midband dipoles 115. Both the lowband dipoles 110 and midband dipoles 115 are arranged in columns along the vertical axis (or y-axis). In the illustrated example, the lowband dipoles 110 are arranged in three columns with the center column disposed along the center of the split sector array face along the azimuth axis (or x-axis); and the midband dipoles are arranged in six columns and interleaved with the lowband dipoles 110 along the y-axis.

Figure 1B:
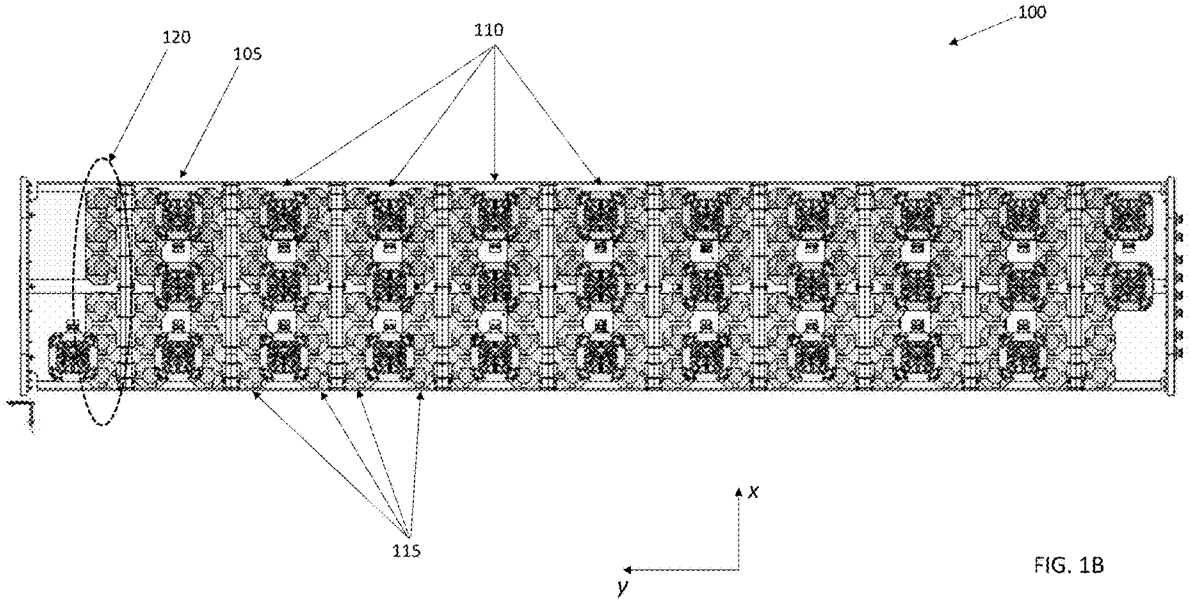
FIG. 1B is a top-down view of the exemplary antenna of FIG. 1A.

FIG. 1B is a top-down view (along the negative boresight axis (or z-axis) of the exemplary antenna 100. Illustrated are the three columns of lowband dipoles 110 and the six columns of midband dipoles 115. Each row 120 of midband dipoles 115 has two sets of three midband dipoles 115, each of which is disposed on a different angled portion of split sector reflector 105.

Figure 1C:
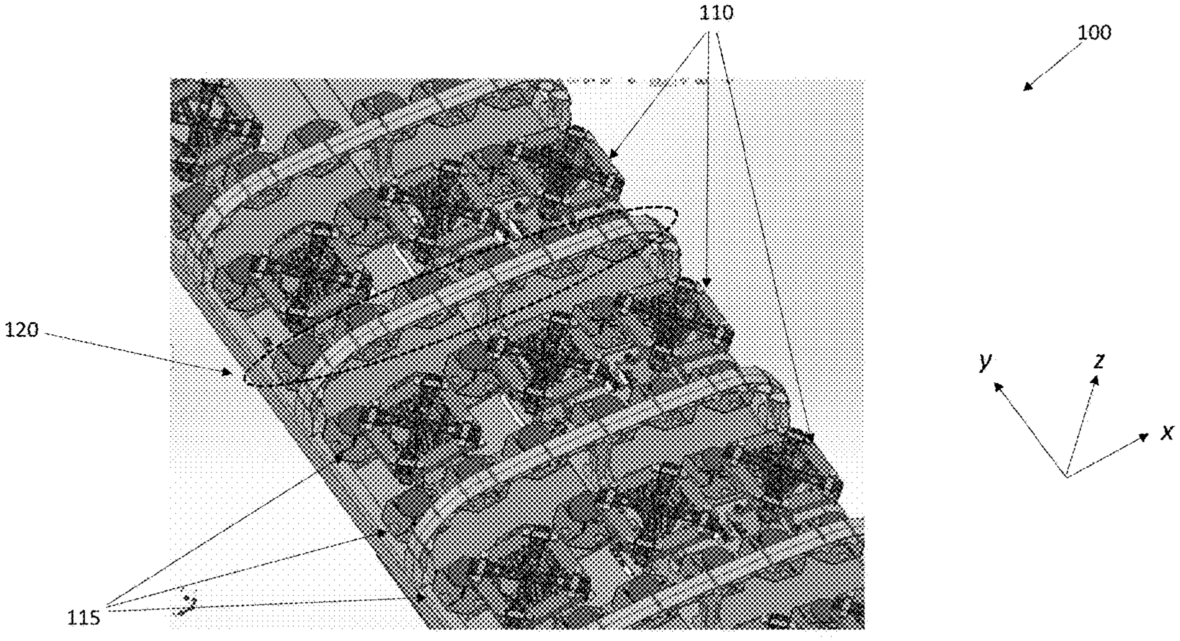
FIG. 1C is a magnified view of a portion of the exemplary antenna of FIG. 1A.

FIG. 1C is a magnified view of a portion of the exemplary antenna 100, more clearly illustrating the arrangements of lowband dipoles 110 with each row 120 of midband radiators.

Figure 2:
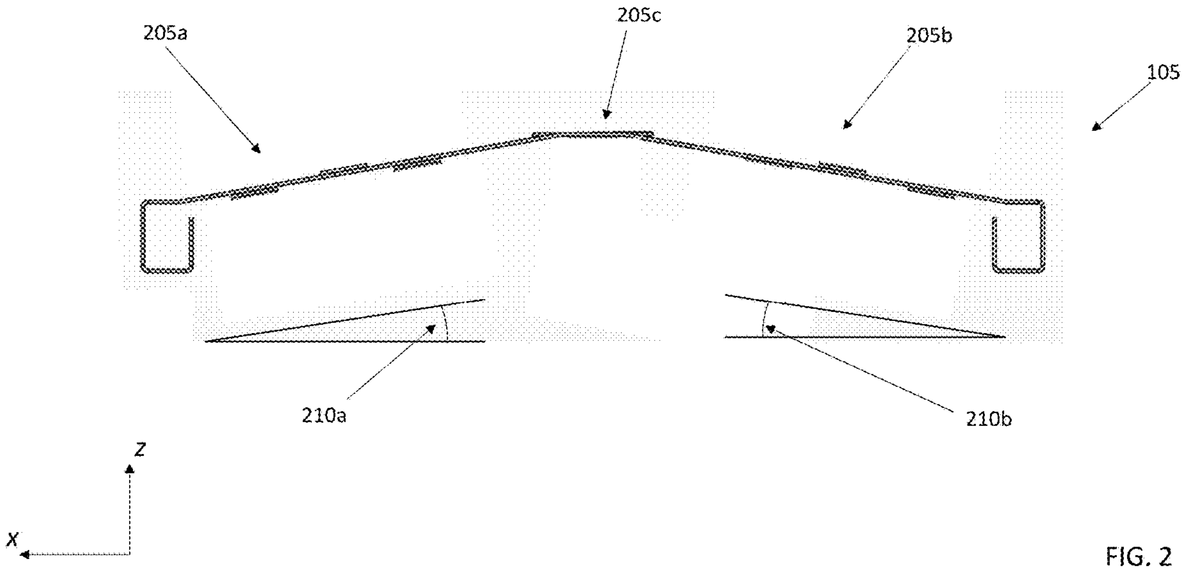
FIG. 2 illustrates an exemplary reflector of the disclosed split sector array face.

FIG. 2 is a view of exemplary split sector reflector 105 along the y-axis. Split sector reflector 105 has a two inclined sector panels 205*a* and 205*b* and a center flat section 205*c*. Inclined sector panel 205*a* may be tilted in the azimuth plane (defined by the x-axis and z-axis) at an angle 210*a*, which in this example is 10 degrees of tilt. Inclined sector panel 205*b* may be tilted in the azimuth plane at an angle 210*b*, which in this example is −10 degrees of tilt.

Figure 3:
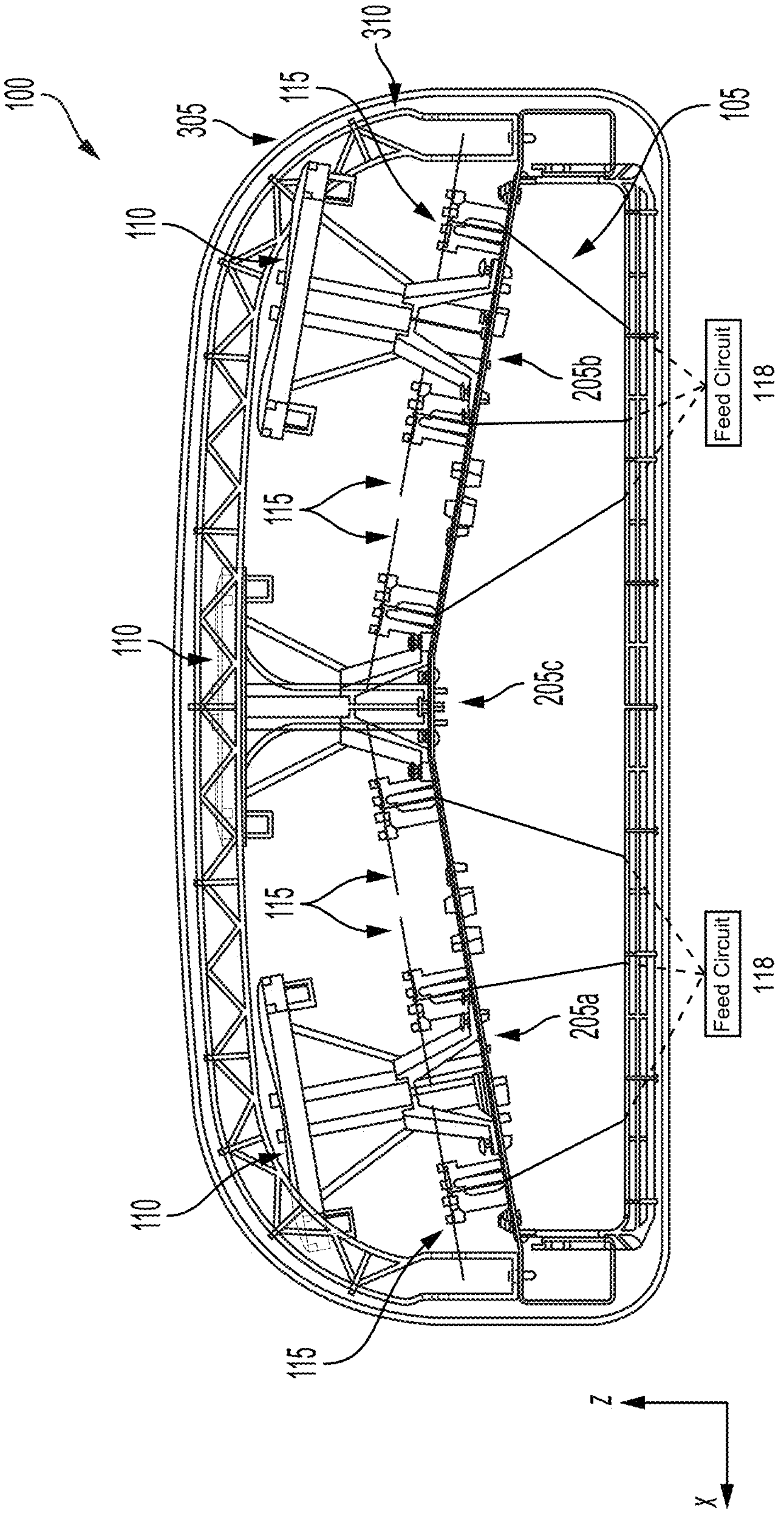
FIG. 3 is a view along the vertical axis of an exemplary antenna having a split sector array face according to the disclosure.

FIG. 3 is a view along the y-axis of an exemplary antenna 100 having a split sector array face according to the disclosure. Illustrated is split sector reflector 105 having its two inclined sector panels 205*a*/205*b* and center flat section 205*c*. Disposed on inclined sector panel 205*a* are three columns of midband dipoles 115 and one column of lowband dipoles 110. Disposed on inclined sector panel 205*b* are three columns of midband dipoles 115 and one column of lowband dipoles 110. The third column of lowband dipoles 110 is disposed on center flat section 205*c*. Also illustrated is a radome 305, which is supported by a series of radome supports 310. As Illustrated, the three columns of midband dipoles 115 and the single column of lowband dipoles 110 on inclined sector panel 205*a* are tilted at angle 210*a* (10 degrees in our example); and the three columns of midband dipoles 115 and the single column of lowband dipoles 110 disposed on inclined sector panel 205*b* are tilted at angle 210*b* (−10 degrees in our example).

Figure 4:
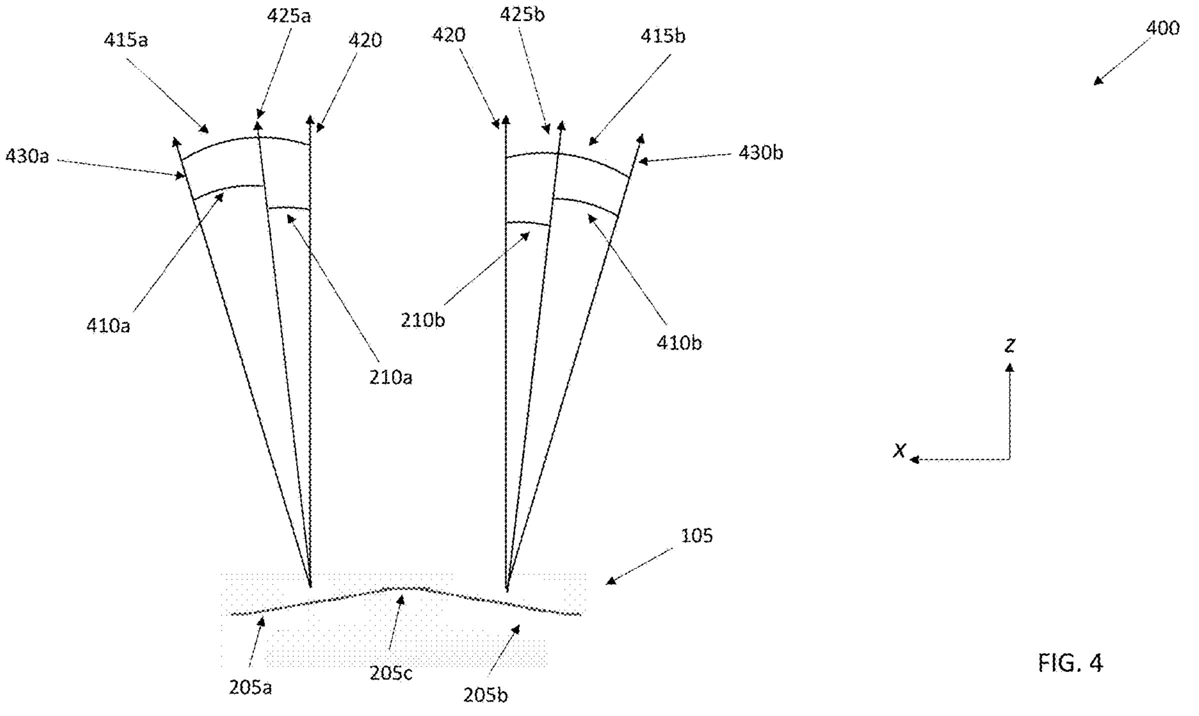
FIG. 4 illustrates the combination of mechanical and electrical tilt angles for the midband dipoles of the split sector array face according to the disclosure.

FIG. 4 illustrates the combination of mechanical and electrical tilt angles 400 for the midband dipoles 110 of the split sector array face according to the disclosure. Illustrated is split sector reflector 105 and its two inclined sector panels 205*a*/205*b* and center flat section 205*c*.

Illustrated with inclined sector panel 205*a* is a set of vectors. Vector 420 corresponds to the boresight direction of antenna 100, which is parallel to the z-axis. To the left of vector 420 is vector 425*a*, which corresponds to the propagation vector normal to inclined sector panel 205*a* and has a tilt angle 210*a* (disclosed above) of 10 degrees from vector 420. To the left of vector 425*a* is vector 430*a*, which is tilted from vector 425*a* in the azimuth plane (defined by x-axis and z-axis) by an electrical tilt angle 410*a*. In this exemplary embodiment, electrical tilt angle 410*a* is 17 degrees. Accordingly, vector 430*a* is tilted 27 degrees relative to boresight vector 420 in the azimuth plane. Vector 430*a* represents the direction of a first midband beam (not shown) radiated by the midband dipoles 115 disposed on inclined sector panel 205*a*.

Similarly, illustrated with inclined sector panel 205*b* is a set of vectors. Vector 420 corresponds to the boresight direction of antenna 100, which is parallel to the z-axis. To the right of vector 420 is vector 425*b*, which corresponds to the propagation vector normal to inclined sector panel 205*b* and has a tilt angle 210*b* (disclosed above) of −10 degrees from vector 420 in the azimuth plane. To the right of vector 425*b* is vector 430*b*, which is tilted from vector 425*b* by an electrical tilt angle 410*b*. In this exemplary embodiment, electrical tilt angle 410*b* is −17 degrees. Accordingly, vector 430*b* is tilted −27 degrees relative to boresight vector 420 in the azimuth plane. Vector 430*b* represents the direction of a second midband beam (not shown) radiated by the midband dipoles 115 disposed on inclined sector panel 205*b*.

The electrical tilt angle 410*a* may be achieved by having the feed circuitry 118 for the midband dipoles 115 on inclined sector panel 205*a* configured to impart appropriate amplitude and phase weighting to the signals to each of the individual columns of midband dipoles 115. Similarly, electrical tilt angle 410*b* may be achieved by having the feed circuitry 118 for the midband dipoles 115 on inclined sector panel 205*b* configured to impart appropriate amplitude and phase weighting to the signals to each of the individual columns of midband dipoles 115.

Figure 5:
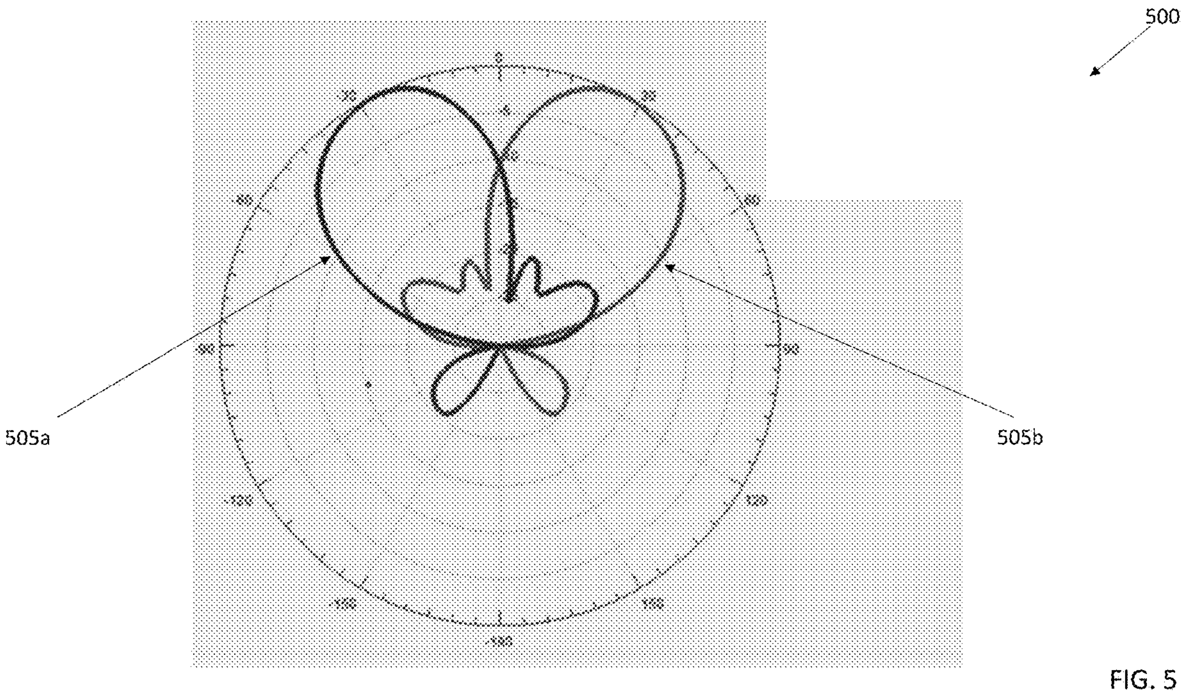
FIG. 5 illustrates an exemplary gain pattern of two sets of midband dipole columns configured for mechanical and electrical tilt according to the disclosure.

FIG. 5 illustrates an exemplary gain pattern 500 of two sets of midband dipole columns configured for mechanical and electrical tilt according to the disclosure. Gain pattern 505*a* corresponds to the combination of the three columns of midband dipoles 115 disposed on inclined sector panel 205*a*, centered around propagation vector 430*a*; and gain pattern 505*b* corresponds to the three columns of midband dipoles 115 disposed on inclined sector panel 205*b* and centered around propagation vector 430*b*.

Having two electrical tilt angles 415*a* and 415*b* at, for example +/−27 degrees respectively, offers advantages. First, if the signals feeding all six columns of midband dipoles 115 are coupled together, then gain patterns 505*a* and 505*b* combine to form a well defined single gain pattern that may have twice the gain of its individual gain patterns 505*a/b*. This 3 dB gain effectively doubles the coverage of antenna 100 along boresight vector 420.

It would be possible to have split sector reflector 105 be flat and rely solely on electrical tilt mechanisms to have the three midband dipole columns 115 on the positive x-direction side center flat section 205*c* radiate along vector 430*a* and the three midband dipole columns 115 on the negative x-direction side of center flat section 205*c* radiate along vector 430*b*. However, using electrical tilt mechanisms to tilt a given beam +/−27 degrees causes a reduction in gain along vector 430*a/b* and increases sidelobes, degrading the quality of the beam. By providing +/−10 degrees of mechanical angular bias, vectors 430*a/b* may be achieved with only +/−17 degrees of mechanical tilt, mitigating beam quality degradation from electrical tilting. Although it would be possible to not use any electrical tilt mechanism and rely solely on mechanical tilt, this would increase the depth of radome 305 and the overall volume of antenna 100, worsening its wind loading characteristics.

The split sector configuration of antenna 100 offers another advantage in that the three columns of midband dipoles 115 disposed on inclined sector panel 205*a* and the three columns of midband dipoles 115 disposed on inclined sector panel 205*b* may be fed different signals, enabling antenna 100 to operate two separate sectors in the midband. In this case, gain patterns 505*a* and 505*b* would remain distinct.

Figure 6:
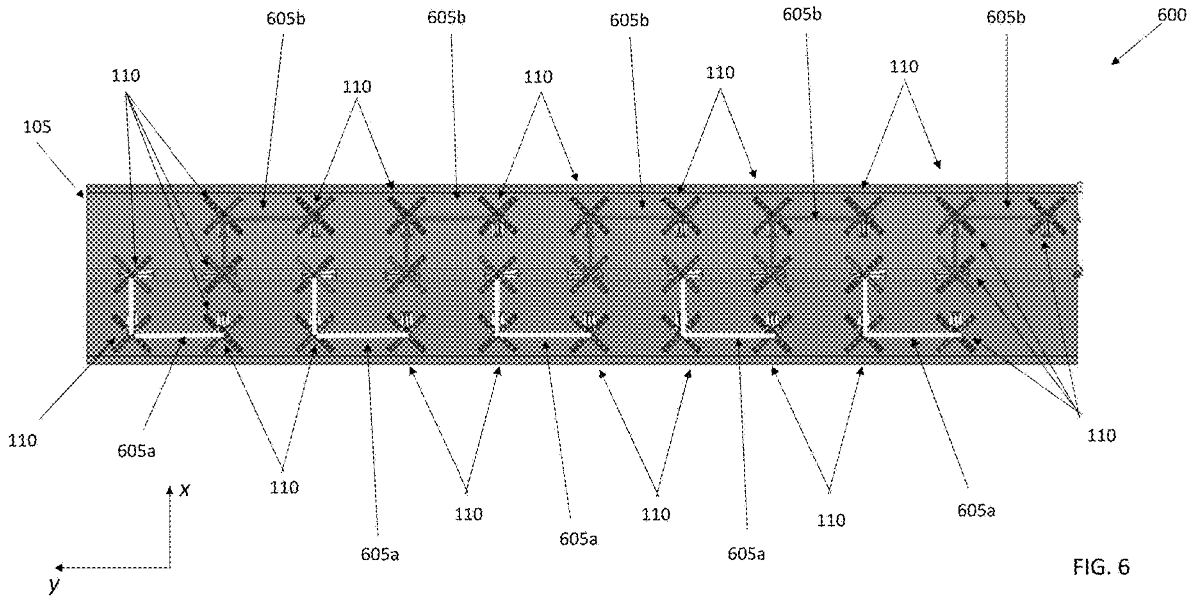
FIG. 6 illustrates an exemplary lowband dipole interconnect pattern that improves the beamwidth quality for the left and right column of lowband dipoles.

FIG. 6 illustrates an exemplary interconnect plan 600 for the lowband dipoles 110 for a four port lowband antenna configuration for antenna 100. The midband dipoles 115 have been omitted from the drawing for the sake of clarity. In this example, the lowband dipoles 110 disposed on inclined sector panel 205*a* and the lowband dipoles 110 disposed on inclined sector panel 205*b* each are connected to alternating lowband dipoles 110 disposed on center flat section 205*c*. Illustrated are dipole interconnects 605*a* that electrically couple adjacent pairs of lowband dipoles 110 disposed on inclined sector panel 105*a* to a neighboring lowband dipole 110 disposed on center flat section 205*c*. Similarly, dipole interconnects 605*b* electrically couple adjacent pairs of lowband dipoles 110 on inclined sector panel 205*b* to a neighboring lowband dipole 110 disposed on center flat section 205*c*.

Each dipole interconnect 605*a/b* may have an "L" shape and may be arranged that alternating lowband dipoles 110 in the center column are coupled to the lowband dipoles 110 disposed on inclined sector panel 205*a* and 205*b*, respectively.

Exemplary interconnect configuration 600 applies to a four port antenna configuration whereby one pair signals (one per +/−45 degree polarization) is applied to the lowband dipoles 110 coupled by dipole interconnects 605*a* and the other pair of signals (one per +/−45 degree polarization) is applied to the lowband dipoles 110 coupled by dipole interconnects 605*b*. Accordingly, antenna 100, with interconnection configuration 600, has two lowband beams that have mirrored azimuth gain patterns.

Figure 7:
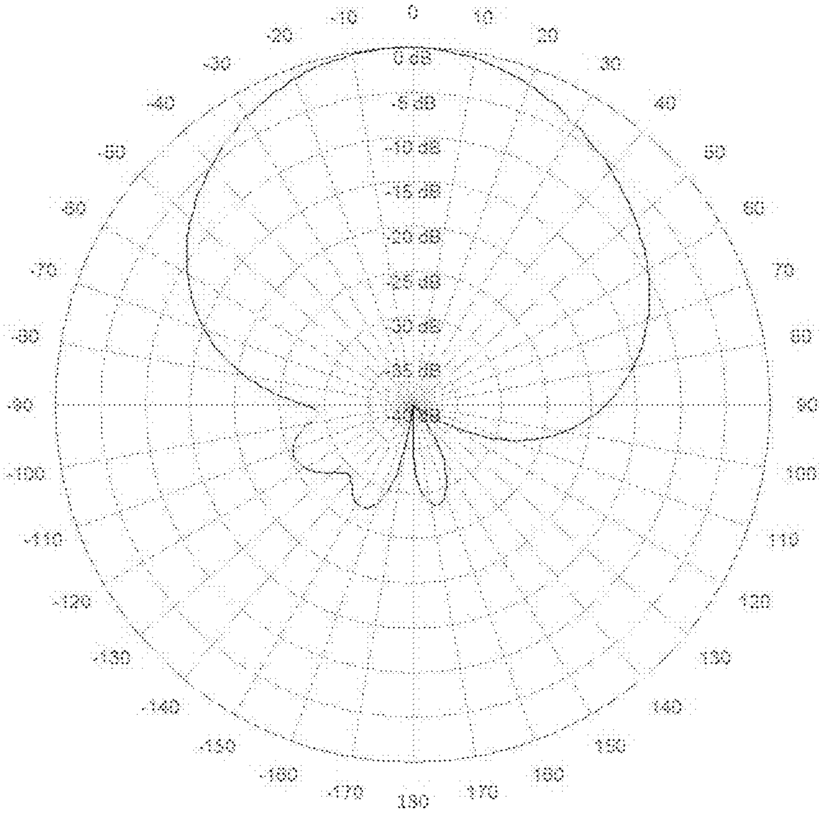
FIG. 7 illustrates an exemplary gain pattern of the combination of left and middle columns of lowband dipoles.

FIG. 7 illustrates an exemplary gain pattern 700 corresponding to the lowband dipoles 110 electrically coupled via dipole interconnects 605*a*. It will be understood that the gain pattern corresponding to the lowband dipoles 110 coupled via dipole interconnects 605*b* will have a mirrored gain pattern.

The invention claimed is:

1. An antenna, comprising:

a split sector reflector having a first inclined sector panel having a first mechanical tilt angle in an azimuth plane, and a second inclined sector panel having a second mechanical tilt angle in the azimuth plane;

a first plurality of columns of first dipoles disposed on the first inclined sector panel; and a second plurality of columns of first dipoles disposed on the second inclined sector panel, wherein the first plurality of columns of first dipoles are coupled to a first feed circuit that is configured to impart a first electrical tilt at a first electrical tilt angle in the azimuth plane, and wherein the second plurality of columns of first dipoles are coupled to a second feed circuit that is configured to impart a second electrical tilt at a second electrical tilt angle in the azimuth plane.

2. The antenna of claim 1, wherein the first mechanical tilt angle is equal and opposite to the second mechanical tilt angle.

3. The antenna of claim 2, wherein the first mechanical tilt angle is 10 degrees and the second mechanical tilt angle is-10 degrees.

4. The antenna of claim 1, wherein the first electrical tilt angle is equal and opposite to the second electrical tilt angle.

5. The antenna of claim 4, wherein the first electrical tilt angle is 17 degrees and the second electrical tilt angle is −17 degrees.

6. The antenna of claim 1, wherein the first plurality of columns of first dipoles comprises three columns, and wherein the second plurality of columns of first dipoles comprises three columns.

7. The antenna of claim 1, wherein the split sector reflector further comprises a center flat section disposed between the first inclined sector panel and the second inclined sector panel.

8. The antenna of claim 7, further comprising:
a first column of second dipoles disposed on the first inclined sector panel;
a second column of second dipoles disposed on the second inclined sector panel; and
a center column of second dipoles disposed on the center flat section.

9. The antenna of claim 8, wherein the first dipoles comprise midband dipoles.

10. The antenna of claim 9 wherein the second dipoles comprise lowband dipoles.

11. The antenna of claim 10, wherein the first column of second dipoles comprises a plurality of first column adjacent dipole pairs, wherein each of the plurality of first column adjacent dipole pairs are electrically coupled to a dipole interconnect, wherein each dipole interconnect electrically couples the corresponding first column adjacent dipole pair to a neighboring second dipole in the center column of second dipoles.

12. A method of operating a multi-band antenna, the method comprising:
feeding first signals to a first plurality of columns of first dipoles disposed on a first inclined sector panel of a split sector reflector, wherein the first inclined sector panel imparts a first mechanical tilt angle in an azimuth plane of the multi-band antenna and wherein each of the first signals have an amplitude and phase that impart a first electrical tilt angle to a radiation pattern of the first dipoles; and
feeding second signals to a second plurality of columns of second dipoles disposed on a second inclined sector panel of the split sector reflector, wherein the second inclined sector panel imparts a second mechanical tilt angle, opposite the first mechanical tilt angle, in the azimuth plane of the multi-band antenna and wherein each of the second signals have an amplitude and phase that impart a second electrical tilt angle, opposite the first electrical tilt angle, to a radiation pattern of the second dipoles,
wherein the radiation pattern of the first dipoles is biased in the azimuth plane relative to a boresight of the antenna based on the first mechanical tilt and the first electrical tilt,
wherein the radiation pattern of the second dipoles is biased in the azimuth plane relative to a boresight of the antenna based on the second mechanical tilt and the second electrical tilt, and
wherein the bias of the radiation pattern of the second dipoles is opposite that of the bias of the radiation pattern of the first dipoles.

13. The method of claim 12 further comprising:
generating, along the boresight of the antenna, a single gain pattern from the radiation pattern of the first dipoles and radiation pattern of the second dipoles by coupling the first and second signals to both the first plurality of columns of first dipoles and second plurality of columns of second dipoles.

14. The method of claim 12 further comprising:
feeding third signals to a first, second and third column of third dipoles, the first column of third dipoles being disposed on the first inclined sector of the split sector reflector, the second column of third dipoles being disposed on the second inclined sector of the split sector reflector, and the third column of third dipoles being disposed on a non-inclined sector of the split sector reflector, perpendicular to the boresight of the antenna and located between the first and second inclined sectors of the split sector reflector.

15. The method of claim 14, wherein the first and second dipoles are mid-band dipoles and the third dipoles are lowband dipoles.

* * * * *